US011348371B2

United States Patent
Niino (10) Patent No.: US 11,348,371 B2
(45) Date of Patent: May 31, 2022

(54) PERSON DETECTION SYSTEM

(71) Applicant: NEC Corporation, Tokyo (JP)

(72) Inventor: Ryuta Niino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 276 days.

(21) Appl. No.: 16/483,078

(22) PCT Filed: Dec. 12, 2017

(86) PCT No.: PCT/JP2017/044592
§ 371 (c)(1),
(2) Date: Aug. 2, 2019

(87) PCT Pub. No.: WO2018/146938
PCT Pub. Date: Aug. 16, 2018

(65) Prior Publication Data
US 2021/0279450 A1 Sep. 9, 2021

(30) Foreign Application Priority Data
Feb. 13, 2017 (JP) .............................. JP2017-023894

(51) Int. Cl.
*G06K 9/00* (2022.01)
*G06V 40/20* (2022.01)
(Continued)

(52) U.S. Cl.
CPC .............. *G06V 40/20* (2022.01); *G06V 20/53* (2022.01); *G06V 40/10* (2022.01); *G08B 21/02* (2013.01)

(58) Field of Classification Search
CPC ........... G06K 9/00335; G06K 9/00778; G06K 9/00362; G08B 21/02
See application file for complete search history.

(56) References Cited

U.S. PATENT DOCUMENTS

2012/0264456 A1\* 10/2012 Park ....................... H04L 67/18
455/456.3
2015/0039527 A1\* 2/2015 Hanna .................. G06Q 50/265
705/325
(Continued)

FOREIGN PATENT DOCUMENTS

JP 2005-234765 A 9/2005
JP 2006-092396 A 4/2006
(Continued)

OTHER PUBLICATIONS

International Search Report for PCT Application No. PCT/JP2017/044592, dated Mar. 20, 2018.
(Continued)

*Primary Examiner* — Dhaval V Patel (57) ABSTRACT

A person detection system of the present invention includes: a person extraction unit that extracts person information from image information; a group determination unit that extracts behavior information from the image information and determines a group; a first person identification unit that identifies a first person from the image information, based on the person information and the behavior information; a second person identification unit that identifies a second person belonging to a same group as the first person from the image information, based on the person information of a person identified as the first person and the group information; and a position identification unit that identifies a position of the first person and a position of the second person, based on position information of the security cameras used for taking the image information based on which the first person and the second person have been identified, respectively.

11 Claims, 8 Drawing Sheets

(51) Int. Cl.
*G08B 21/02* (2006.01)
*G06V 20/52* (2022.01)
*G06V 40/10* (2022.01)

(56) References Cited

U.S. PATENT DOCUMENTS

2016/0157074 A1* 6/2016 Joao ................... G08B 21/0269
                                                    455/404.2
2018/0268224 A1* 9/2018 Anami ............. G08B 13/19602
2019/0163967 A1* 5/2019 Obaidi ....................... G06T 7/97

FOREIGN PATENT DOCUMENTS

| JP | 2007-060528 A | 3/2007 |
| JP | 2009-199322 A | 9/2009 |
| JP | 2013-069128 A | 4/2013 |
| JP | 2013-191059 A | 9/2013 |
| JP | 2016-201758 A | 12/2016 |

OTHER PUBLICATIONS

Japanese Office Action for JP Application No. 2017-023894 dated Jan. 27, 2021 with English Translation.
Japanese Office Action for JP Application No. 2017-023894 dated Jul. 13, 2021 with English Translation.
Japanese Office Action for JP Application No. 2021-048069 dated Mar. 15, 2022 with English Translation.
Shoji Nishimura et al., Wally : The scalable distributed datastore for an image retrieval system, the 5th forum about data engineering and the information management (the 11th Japan Database Society annual meeting), Institute of Electronics, Information and Communication Engineers data engineering research special committee et al., May 31, 2013.
The image-analysis Solution, finding efficiently quickly a doubtful figure and doubtful action by the image-analysis technology and the platform handling large-scaled processing by NEC, C&C User Forum & iEXPO2012, Nov. 2012.

* cited by examiner

Fig.8

PERSON DETECTION SYSTEM

This application is a National Stage Entry of PCT/JP2017/044592 filed on Dec. 12, 2017, which claims priority from Japanese Patent Application 2017-023894 filed on Feb. 13, 2017, the contents of all of which are incorporated herein by reference, in their entirety.

TECHNICAL FIELD

The present invention relates to a person detection system.

BACKGROUND ART

In a large amusement facility or a commercial facility, if a child gets separated from his/her parent and gets lost, it will be revealed for the first time when a crying child is found by a staff member or a customer and guided to a lost child center. However, they rely on manpower and vision to find a lost child, and therefore, there is a problem that the accuracy is low and it takes time.

Further, in order to make a lost child and his/her parent meet each other after finding the lost child, they currently broadcast the feature of the lost child and wait the parent to ask to a lost child center. However, it is difficult to obtain information from a lost child (especially a younger child). Moreover, because they do not broadcast in some amusement facilities, there is a case where the means for calling attention of the lost child's parent is limited. Consequently, there is a problem that it takes more time to make a lost child and his/her parent meet each other.

On the other hand, as the means for detecting a lost child, a child and his/her parent carry wireless communication devices in advance so that its place is detected or notified by sound. However, a child and his/her parent need to wear such devices at all times, which causes a burden of wearing the devices.

Patent Document 1: Japanese Unexamined Patent Application Publication No. JP-A 2007-060528.

Patent Document 1 discloses a system for detecting a lost child. According to the technique disclosed by Patent Document 1, a registration camera is prepared, the face images of a child and an accompanying person are taken with the registration camera, and each of the face images is associated with an e-mail address or the like and registered in a database. Then, the face image of a person is detected from each image acquired with a security camera, and it is determined whether there is a matching face image. In a case where there is a matching face image, the position of the child is identified based on the position of the security camera, and moreover, the accompanying person is identified from the database.

However, according to the technique disclosed by Patent Document 1, a child and an accompanying person need to be photographed and registered with the registration camera, which is burdensome. On the other hand, if they fail to photograph a child and an accompanying person, there is a problem that the child cannot be detected when gets lost.

SUMMARY

Accordingly, an object of the present invention is to provide a person detection system capable of appropriately detecting a lost person while reducing time and effort, which is the abovementioned problem.

A person detection system as an aspect of the present invention includes: a person extraction unit configured to extract person information representing a person from image information taken with a security camera; a group determination unit configured to extract behavior information representing behavior of the person from the image information and, based on the behavior information, determine a group composed of a plurality of persons and register group information including the person information; a first person identification unit configured to identify a first person from the image information taken with the security camera, based on the extracted person information and the extracted behavior information; a second person identification unit configured to identify a second person belonging to a same group as the first person from the image information taken with the security camera, based on the person information of a person identified as the first person and the group information; and a position identification unit configured to identify a position of the first person and a position of the second person, based on position information of the security cameras used for taking the image information based on which the first person and the second person have been identified, respectively.

Further, a person detection method as another aspect of the present invention includes: extracting person information representing a person from image information taken with a security camera; extracting behavior information representing behavior of the person from the image information and, based on the behavior information, determining a group composed of a plurality of persons and registering group information including the person information; identifying a first person from the image information taken with the security camera, based on the extracted person information and the extracted behavior information; identifying a second person belonging to a same group as the first person from the image information taken with the security camera, based on the person information of a person identified as the first person and the group information; and identifying a position of the first person and a position of the second person, based on position information of the security cameras used for taking the image information based on which the first person and the second person have been identified, respectively.

Further, a computer program as another aspect of the present invention includes instructions for causing an information processing device to realize: a person extraction unit that extracts person information representing a person from image information taken with a security camera; a group determination unit that extracts behavior information representing behavior of the person from the image information and, based on the behavior information, determines a group composed of a plurality of persons and registers group information including the person information; a first person identification unit that identifies a first person from the image information taken with the security camera, based on the extracted person information and the extracted behavior information; a second person identification unit that identifies a second person belonging to a same group as the first person from the image information taken with the security camera, based on the person information of a person identified as the first person and the group information; and a position identification unit that identifies a position of the first person and a position of the second person, based on position information of the security cameras used for taking the image information based on which the first person and the second person have been identified, respectively.

With the configurations as described above, the present invention enables the user to appropriately detect a person while saving the user the trouble.

EXAMPLE EMBODIMENTS

First Example Embodiment

Figure 1:
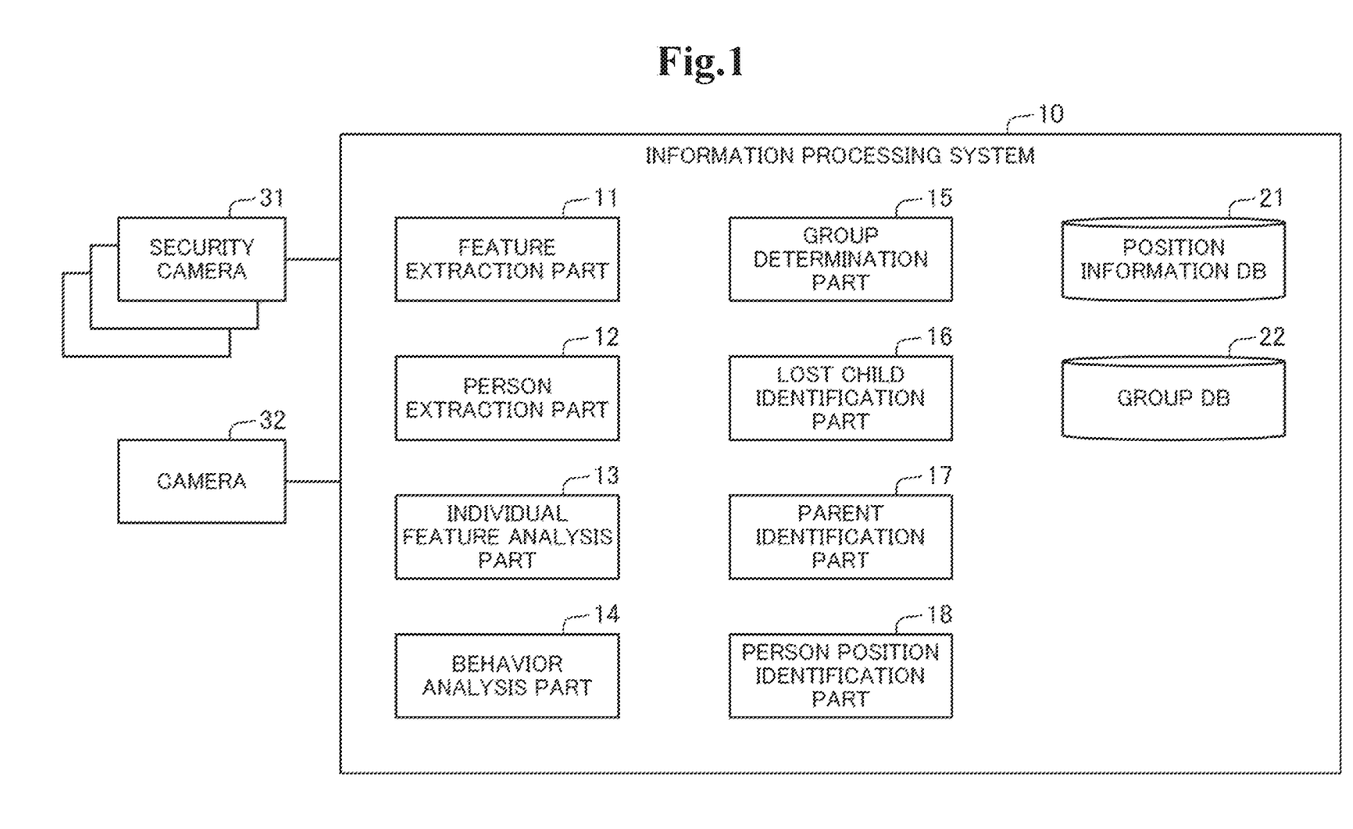
FIG. 1 is a block diagram showing the configuration of an information processing system according to a first example embodiment of the present invention.

A first example embodiment of the present invention will be described with reference to FIGS. 1 to 7. FIG. 1 is a diagram for describing the configuration of an information processing system according to the first example embodiment. FIGS. 2 to 7 are views for describing the operation of the information processing system.

The information processing system (a person detection system) according to the present invention can be used mainly for detecting a lost child and making the lost child and his/her parent meet each other in a large amusement facility or a commercial facility. However, the information processing system according to the present invention is not limited to use for detecting a lost child, and may be used for detecting a person at any place.

[Configuration]

An information processing system 10 according to this example embodiment is configured by one or more information processing devices each including an arithmetic and logic unit and a storage unit. The information processing system 10 includes, as shown in FIG. 1, a feature extraction part 11, a person extraction part 12, an individual feature analysis part 13, a behavior analysis part 14, a group determination part 15, a lost child identification part 16, a parent identification part 17, and a person position identification part 18, which are constructed by execution of a program by the arithmetic and logic unit. Moreover, the information processing system 10 includes a position information database (DB) 21 and a group database (DB) 22, which are formed in the storage unit.

Moreover, a security camera 31 and a camera 32 can be connected to the information processing system 10. The security cameras 31, which are installed at a plurality of places in a facility, take images of their installation places and input image information into the information processing system 10. At this time, in the information processing system 10, the security camera 31 and position information corresponding to the installation place of the security camera 31 are associated and registered. That is to say, the information processing system 10 can recognize a position where the image information input from the security camera 31 has been taken. For example, the security cameras 31 are installed at the entrance of the facility and at a place to be a mark in the facility.

Further, the camera 32 is a camera which is different from the security camera 31 and prepared at a predetermined place in the facility. The camera 32 may be a digital camera or a camera installed in a mobile phone. The camera 32 is connected to the information processing system by wireless or wired communication and is capable of inputting image information taken thereby into the information processing system 10.

The feature extraction part 11, the person extraction part 12, and the individual feature analysis part 13 function in cooperation as a person extraction unit that extracts person information representing a person from image information taken with the security camera 31. To be specific, the feature extraction part 11 extracts feature information representing an external feature like an outline of a person from the image information. The person extraction part 12 automatically perceive a person from the extracted feature information. The individual feature analysis part 13 analyzes an individual feature such as age, clothes and build of each person having been perceived, and stores as person information of each person into the position information database 21 so that position information and imaging time of the security camera 31 are associated. Consequently, in the position information database 21, the feature of each person and the place and time that the person appears are stored, and updated along with movement of the person.

The behavior analysis part 14 and the group determination part 15 function in cooperation as a group determination unit that determines a group composed of a plurality of persons and registers group information including a plurality of person information of the persons determined as a group into the group database 22. To be specific, the behavior analysis part 14 analyzes the behavior of a person from an image that is a moving image and extracts behavior information. The group determination part 15, based on the behavior information, analyzes the behavior of a plurality of persons close in distance to each other, for example, the direction and timing of movement and whether they are talking with each other, and automatically determines whether they are a plurality of persons or form a group. In the case of determining as a group, the group determination part 15 registers the plurality of person information as one group information into the group database 22.

The group registration process by the group determination part 15 is performed, for example, based on a video taken with the security camera 31 installed near the entrance of the facility. However, the group registration process may be performed based on a video taken with all the security cameras 31, and the group information may be updated every time determination of a group is performed. For example, in a case where it is determined that a group originally composed of four persons has been divided into two groups of two persons each, the group determination part 15 may register group information of the groups of two persons each and also register the group information in association with each other.

The lost child identification part 16 (a first person identification unit) identifies a lost child (a first person) based on the extracted person information and behavior information, from the image information taken with the security camera. For example, the lost child identification part 16 extracts only a person of age who can especially get lost from an image taken with the security camera 31 installed at a certain place, based on person information as the result that the feature extraction part 11, the person extraction part 12 and the individual feature analysis part 13 described above extract a feature such as an outline, automatically perceive a person and analyze an individual feature such as age, clothes and build of each person. Moreover, in a case where it is determined that a person possibly gets child based on information such as uneasy look and behavior and whether the person is acting alone, which is the analysis result of the behavior of the person performed by the behavior analysis part 14 in parallel, the lost child identification part 16 specifies the person as a lost child.

The lost child identification part 16 may be configured so as not to determine as a lost child depending on the installation position and situation of the security camera 31. For example, at a place where a child is considered to be exceptionally distant from his/her parent such as when the child is in a nursery, the lost child identification part 16 may not identify the child as a lost child even if the child may behave alone.

The person position identification part 18 identifies and outputs the position of a lost child identified by the lost child identification part 16 as described above, based on the position information of the security camera 31 that has photographed the lost child. The position information of the lost child is output, for example, so as to notify the staff of the facility so that the staff member can be sent to the position of the lost child.

The parent identification part 17 (a second person identification unit), based on the person information of the lost child identified by the lost child identification part 16 and the group information registered in the group database 22, identifies a person (a second person) who belongs to the same group as the lost child. For example, the parent identification part 17 queries the group database 22 for the feature information of the lost child, identifies the group to which the lost child belongs, and identifies a parent who seems to be an adult from the person information in the identified group.

The person position identification part 18 identifies the position of the parent identified by the parent identification part 17 as described above, by querying the position information database 21 for the person information of the parent. The position information of the parent is output so as to notify the facility staff so that a member of the staff can be sent to the parent's location, for example.

Further, the feature extraction part 11, the person extraction part 12 and the individual feature analysis part 13 described above function in cooperation as a person extraction unit that extracts person information representing a person from image information taken with the camera 32. To be specific, a parent who is searching for a lost child is photographed with the camera 32 and, in the same manner as described above, feature information such as an outline of a person is extracted from image information of the parent, the person is automatically perceived, and individual feature analysis is performed. Then, the extracted person information is passed to the parent identification part 17.

The parent identification part 17 (a third person identification unit) searches the group database 22 based on the person information extracted from an image taken with the camera 32. Then, the parent identification part 17 identifies, as a parent (a third person), a person whose person information matches the person information extracted from the image, of the person information included in the group information registered in the group database 22. At this time, the parent identification part 17 also identifies a group to which the identified parent belongs.

Further, the lost child identification part 16 (a fourth person identification unit) identifies, from the identified group of the parent as described above, a lost child (a fourth person) based on the person information included in the group information, and extracts person information of the lost child. At this time, for example, the lost child identification part 16 checks the person information in the group, identifies, as a lost child, a person determined to be a child based on the feature information, and extracts the person information. Moreover, the lost child identification part 16 queries the position information database 21 for person information of the extracted lost child, and identifies a person having matching person information as a lost child.

The person position identification part 18 identifies the position of the lost child by using the position information database 21 based on the person information of the lost child as described above. The position information of the lost child is output so as to notify the facility staff so that a staff member can be sent to the position of the lost child.

[Operation]

Next, the operation of the abovementioned information processing system will be described. Below, (1) a group registration operation, (2) a first lost child finding operation, and (3) a second lost child finding operation will be described in details.

(1) Group Registration Operation

Figure 2:
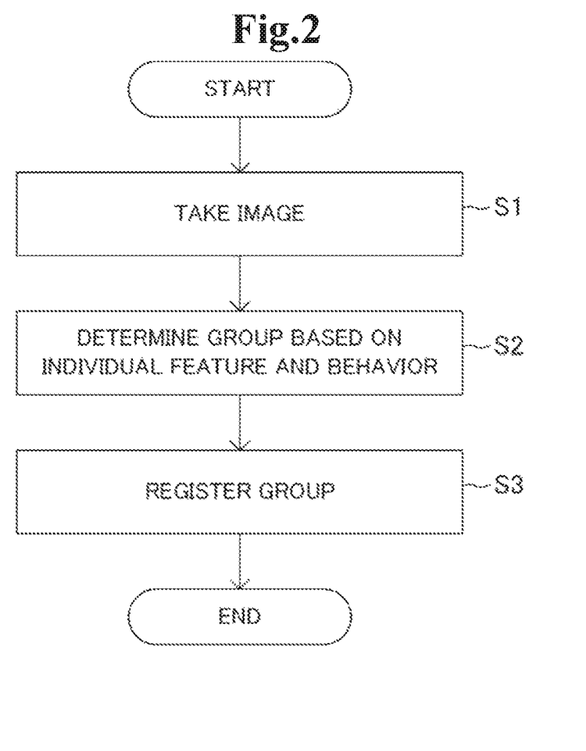
FIG. 2 is a flowchart showing the operation of the information processing system disclosed in FIG. 1.
Figure 3:
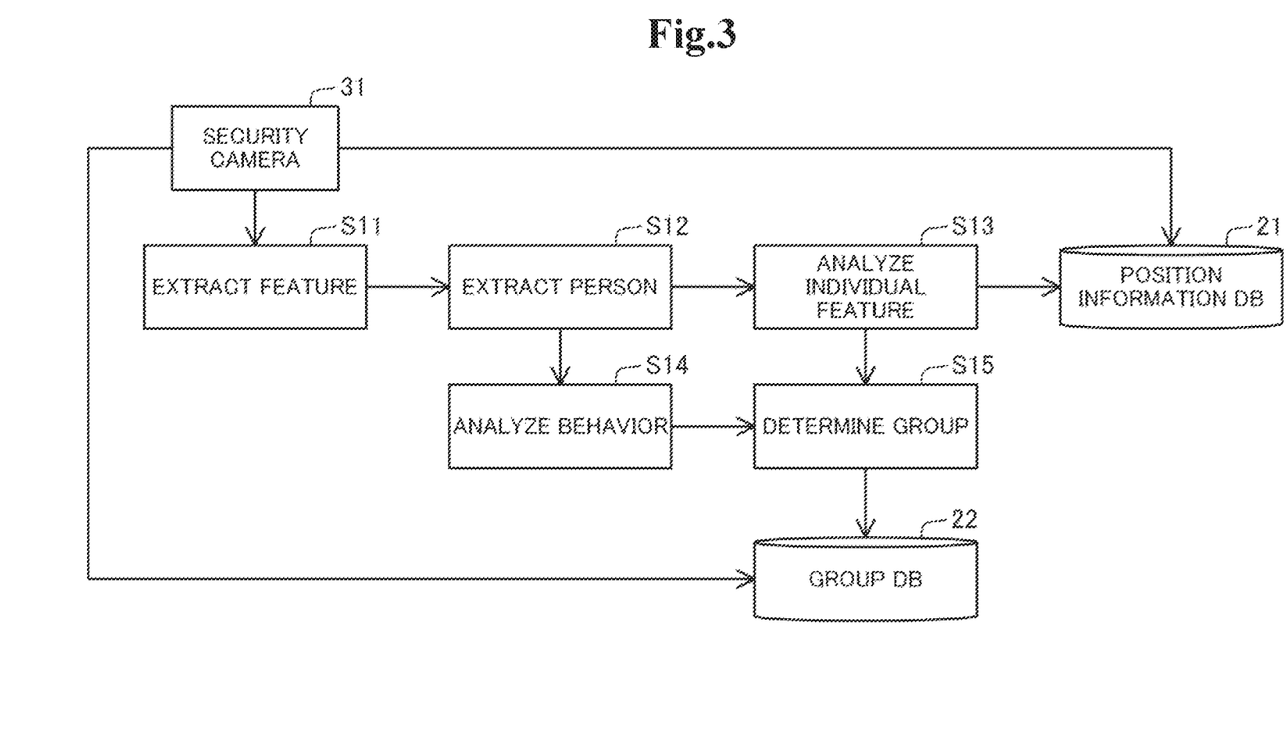
FIG. 3 is a view showing the operation of the information processing system disclosed in FIG. 1.

With reference to FIGS. 2 and 3, an operation of determining position information and group information of guests and updating a database with the information in real time by using the security camera 31 installed in a facility will be described.

First, images of visitors are taken with the security cameras 31 at the respective entrances of the facility (step S1 in FIG. 2). Then, features such as outlines are extracted from the images (step S11 in FIG. 3), and the persons are automatically perceived (step S12 in FIG. 3). Moreover, individual features such as ages, clothes and builds of the respective persons are analyzed to extract person information of each of the persons, and the person information is associated with position information of the security camera 31 and stored into the position information database 21 (step S13 in FIG. 3).

Further, on persons who are close to each other in distance, behavior analysis is performed to analyze the direction and timing of movement and whether they are talking with (step S14 in FIG. 3) and it is automatically determined whether they are a plurality of persons or a group (step S2 in FIG. 2, step S15 in FIG. 3). For example, a combination of a child and his/her parent is determined as a group in particular by using height and age recognition. In a case where a plurality of persons are determined as a group, group information including person information of the respective persons is registered into the group database 22 (step S3 in FIG. 2). Thus, as will be described later, when a person of a certain group becomes the target of search, the information of the other person determined to be in the same group can be output.

Images are taken in real time at all times with each of the security cameras 31 in the facility, person extraction and analysis are performed, and group information including person information is updated and registered together with the position information of the security camera 31. Consequently, it is properly updated where a person or a group is. Moreover, in a case where it is determined that all the members of a certain group have exit by taking images with the security cameras 31 near the respective exits and analyzing the images, the group information is deleted from the group database 22.

At the same time, every time an image is taken with each of the security cameras 31, as described above, person information is extracted from the image and position information of the person information is registered into the position information database 21. Then, the position information database 21 is updated along with movement of the person.

(2) First Lost Child Finding Operation

Figure 4:
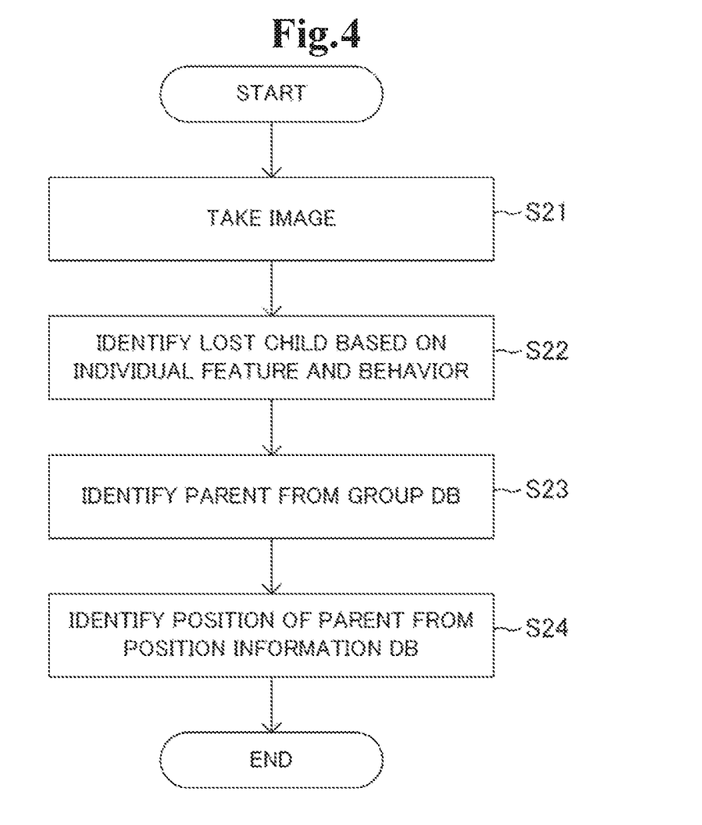
FIG. 4 is a flowchart showing the operation of the information processing system disclosed in FIG. 1.
Figure 5:
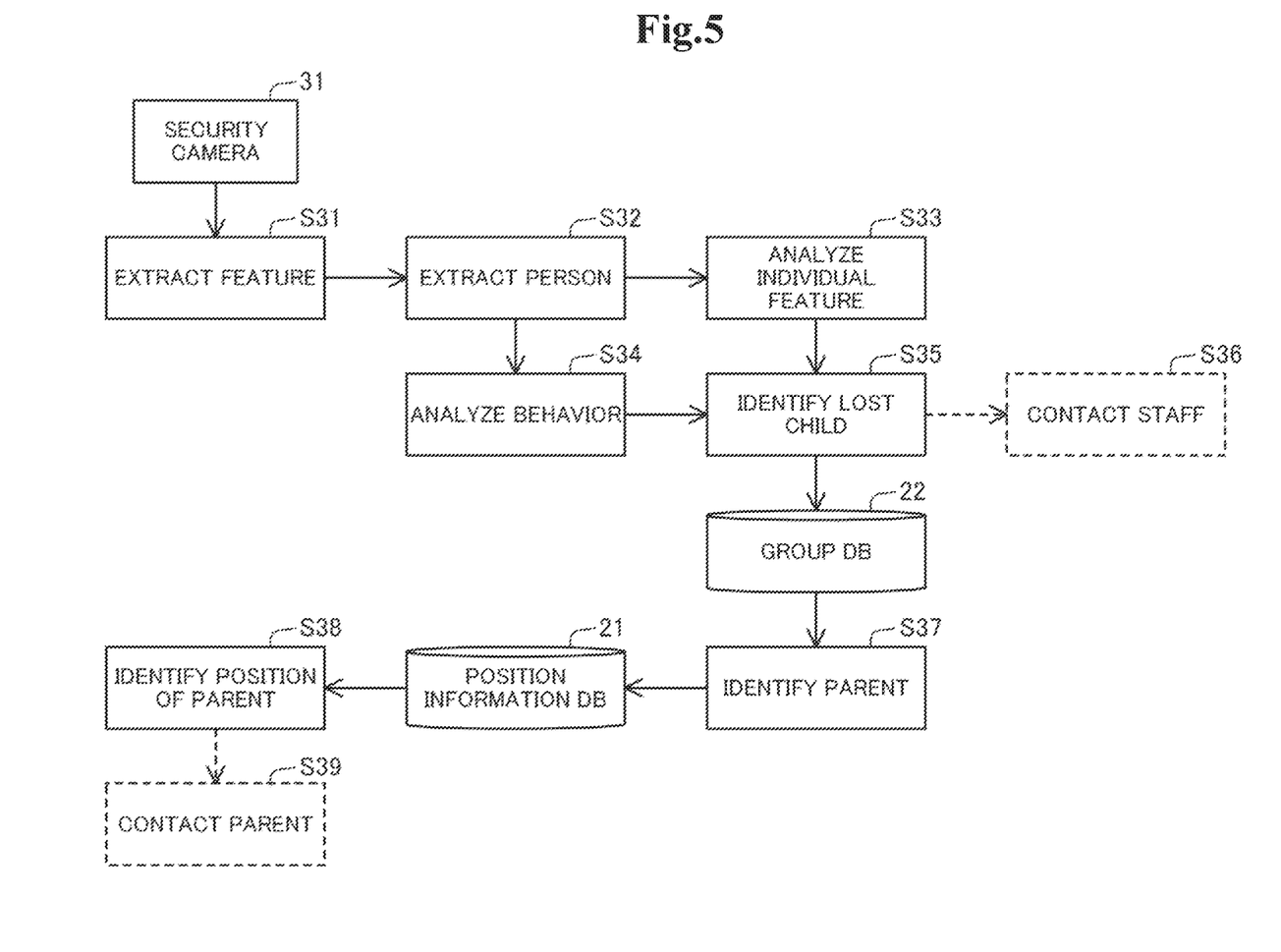
FIG. 5 is a view showing the operation of the information processing system disclosed in FIG. 1.

With reference to FIGS. 4 and 5, an operation up to contact a lost child's parent in the case of finding the lost child before contacted by the parent will be described.

First, images are taken with the security cameras 31 installed at the respective places in the facility (step S21 in FIG. 4). Then, features such as outlines are extracted from the images (step S31 in FIG. 5), and persons are automatically perceived (step S32 in FIG. 5). Moreover, individual features such as ages, clothes and builds of the respective persons are analyzed (step S33 in FIG. 5), and only a person of age who can be lost is extracted in particular. In parallel, behavior analysis of the person is performed (step S34 in FIG. 5) and, in a case where it is determined that the person may have gotten lost based on information such as uneasy expression or behavior and information whether the person is acting alone, the person is identified as a lost child (step S22 in FIG. 4, step S35 in FIG. 5). At this time, the facility staff is notified immediately so that a member of the staff can be sent to the site (step S36 in FIG. 5). When the staff member determines at the site that the person is a lost child, the staff member picks up the lost child.

Further, in addition to the abovementioned process, person information of the identified lost child is queried to the group database 22 and person information of his/her parent is identified (step S23 in FIG. 4, step S37 in FIG. 5). For example, a person who seems to be an adult is identified as the parent based on the person information included by a group to which the identified lost child belongs. Then, the person information of the parent is queried to the position information database 21, and the current position of the parent is identified (step S24 in FIG. 4, step S38 in FIG. 5). At this time, by sending a staff member there, it is possible to inform the parent that they have picked up the lost child (step S39 in FIG. 5) and promptly make the lost child and the parent meet each other.

(3) Second Lost Child Finding Operation

Figure 6:
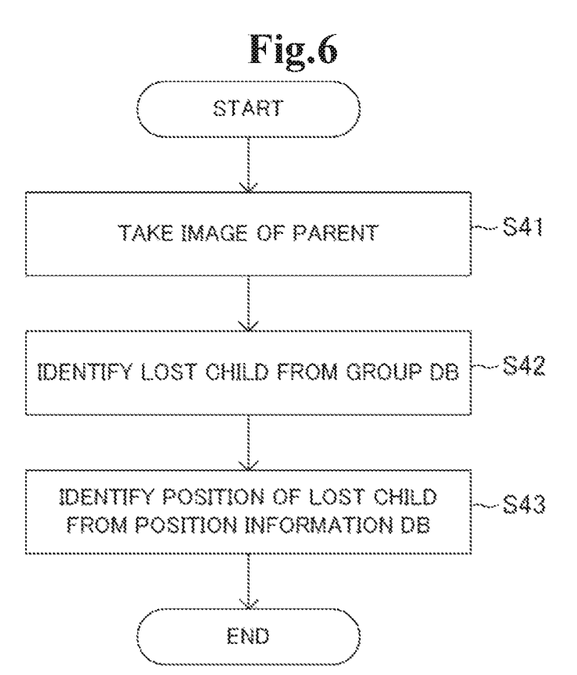
FIG. 6 is a flowchart showing the operation of the information processing system disclosed in FIG. 1.
Figure 7:
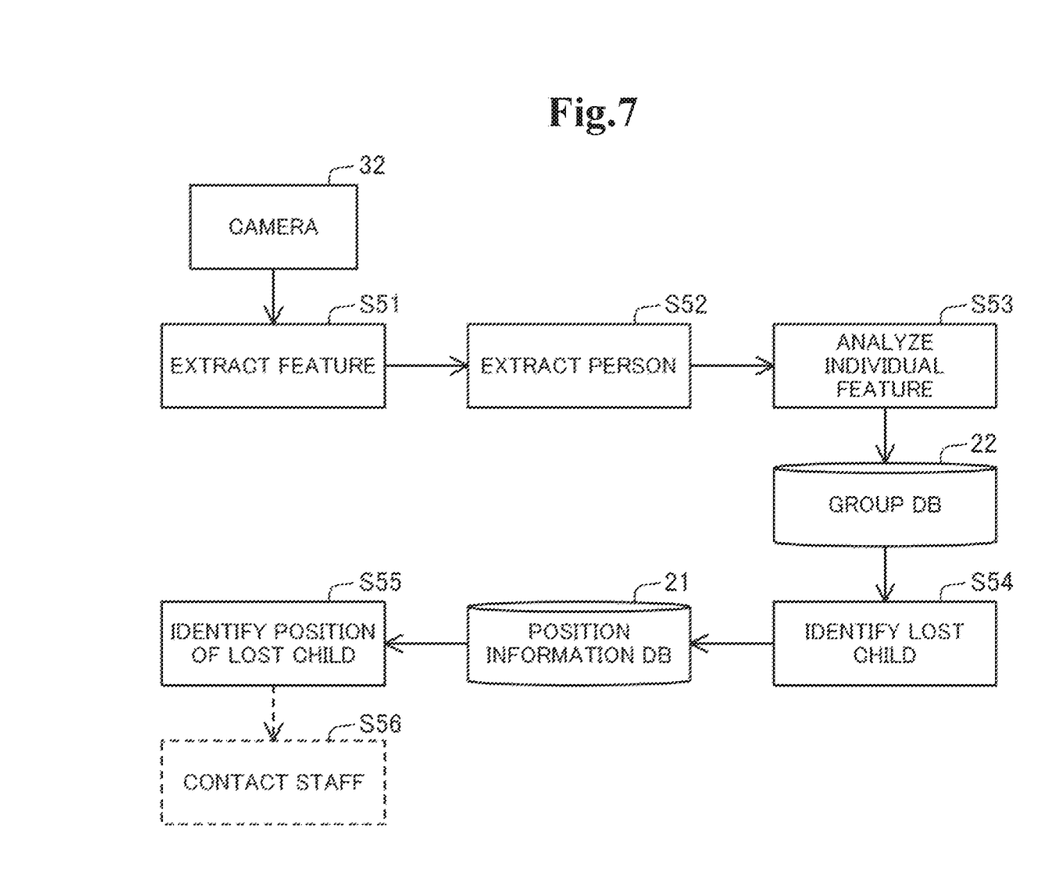
FIG. 7 is a view showing the operation of the information processing system disclosed in FIG. 1.

With reference to FIGS. 6 and 7, an operation up to pick up a lost child in a case where there has been an inquiry about the lost child from his/her parent will be described.

When a parent inquires of the lost child center whether there is a lost child, an image of the parent is taken with the camera 32 at first (step S41 in FIG. 6). Through extraction of a feature (step S51 in FIG. 7), extraction of a person (step S52 in FIG. 7) and extraction of an individual feature (step S53 in FIG. 7) from the image of the parent having been taken, person information of the parent is extracted. Then, a query is made to the group database 22 based on the person information of the parent, a lost child in the same group as the parent is identified (step S42 in FIG. 6, step S54 in FIG. 7), and person information representing the feature of the lost child is acquired.

Subsequently, the person information of the lost child is queried to the position information database 21, and position information of the lost child is acquired (step S43 in FIG. 6, step S55 in FIG. 7). By informing the staff of the position information, a member of the staff can promptly pick up the lost child at the site and make the lost child and the parent meet each other.

In this example embodiment, an image of a parent taken with the camera 32 is used for a query to the group database 22. This is effective to prevent kidnap due to pretense of a fake parent and avoid a manual mistake.

Thus, according to the present invention, it is possible to, when a child gets lost, detect it and make the child and his/her parent meet each other in a shorter time, with more accuracy, and with less manpower. At this time, without the need for a mobile phone or the like as a mobile device, it is possible to structure a system with a camera device installed within a site, so that it is possible to reduce the time and effort of a service provider and a user.

In the abovementioned information processing system, when it is difficult to detect a lost child or detect a group due to a matter of the accuracy of the cameras or the accuracy of behavior recognition, the target may not be limited to one, and a plurality of candidates may be responded. In this case, one correct candidate may be visually selected from the selected targets based on a given hint (information at what percentage of probability they match, information that their faces are similar but their clothes are different, and the like). Even when a plurality of candidates are responded, if the possibility of correctness can be calculated in the process of matching, the candidates are sorted and output in the order of high possibility of correctness helps making the lost child and the parent meet each other earlier.

Second Example Embodiment

Figure 8:
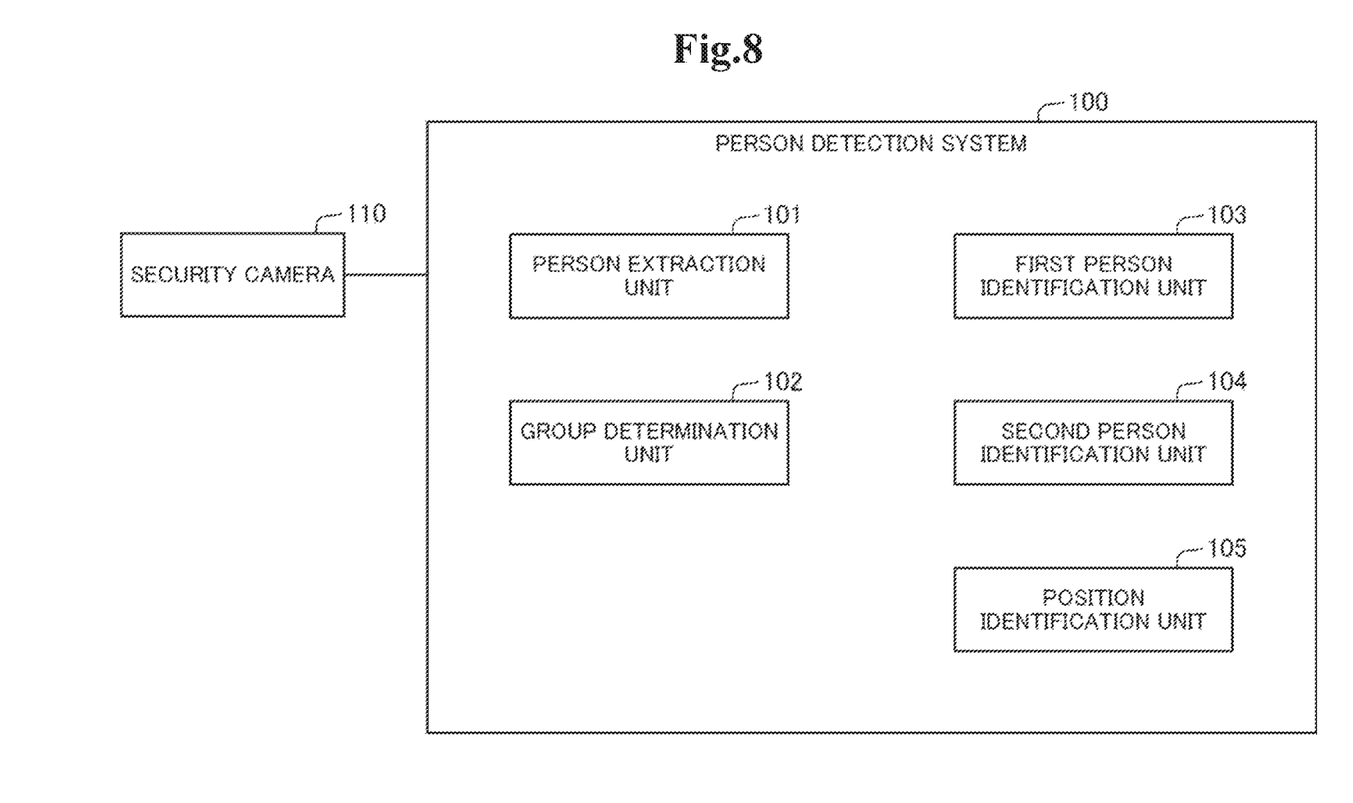
FIG. 8 is a block diagram showing the configuration of an information processing system according to a second example embodiment of the present invention.

Next, a second example embodiment of the present invention will be described with reference to FIG. 8. FIG. 8 is a block diagram showing the configuration of a person detection system according to the second example embodiment. The person detection system in this example embodiment shows the overview of the configuration of the information processing system described in the first example embodiment.

As shown in FIG. 8, a person detection system 100 according to this example embodiment includes:

a person extraction unit 101 configured to extract person information representing a person from image information taken with a security camera 110;

a group determination unit 102 configured to extract behavior information representing behavior of the person from the image information and, based on the behavior information, determine a group composed of a plurality of persons and register group information including the person information;

a first person identification unit 103 configured to identify a first person from the image information taken with the security camera 110, based on the extracted person information and the extracted behavior information;

a second person identification unit 104 configured to identify a second person belonging to a same group as the first person from the image information taken with the security camera 110, based on the person information of a person identified as the first person and the group information; and a position identification unit 105 configured to identify a position of the first person and a position of the second person, based on position information of the security cameras 110 used for taking the image information based on which the first person and the second person have been identified, respectively.

The respective components 101 to 105 described above may be structured by execution of a program by an arithmetic and logical unit installed in the information processing device.

According to the person detection system with the above configuration, first, person information and behavior information are extracted from image information taken with the security camera, and group information including a plurality of persons is automatically registered based on the person information and the behavior information. Therefore, it does not take time for the user, and a group is surely registered. After that, when a first person (for example, a lost child) is identified based on the person information and the behavior information extracted from the image information taken with the security cameras installed at all places, a second person (for example, a parent) of the group to which the first person belongs is identified based on the person information and group information of the first person. Then, by using the position information of the security cameras having captured the first person and the second person, respectively, it is possible to identify the positions. As a result, the need for preparation such as taking an image with a registration camera in advance is eliminated, so that it is possible to appropriately detect a person while saving the user the trouble.

Further, in addition to the abovementioned configuration, the person extraction unit is configured to, from image information of a person taken with a camera different from the security camera, extract person information of the person. The person detection system further includes: a third person identification unit configured to identify a third person from the group information, based on the person information of the person extracted from the image information taken with the camera different from the security camera; and a fourth person identification unit configured to identify a fourth person belonging to a same group as the identified third person, based on the person information of a person identified as the third person and the group information, and also identify the fourth person from the image information taken with the security camera, based on the extracted person information. Moreover, the position identification unit is configured to identify a position of the fourth person, based on position information of the security camera used for taking the image information based on which the fourth person has been specified.

According to the above configuration, first, by taking an image of a third person (for example, a parent) with a camera which is different from the security camera, a third person in the group information is identified from person information extracted from the image information. Then, it is possible to identify a fourth person (for example, a lost child) belonging to the same group as the third person within the group information to acquire person information of the fourth person, and identify the fourth person from the image information captured by the security camera to identify the position. Thus, even when the third person is looking for the fourth person, it is possible to appropriately detect the person.

<Supplementary Notes>

The whole or part of the example embodiments disclosed above can be described as in the following Supplementary Notes. Below, the outline of the configurations of a person detection system, a program and a person detection method according to the present invention will be described. However, the present invention is not limited to the following configurations.

(Supplementary Note 1)

A person detection system comprising:

a person extraction unit configured to extract person information representing a person from image information taken with a security camera;

a group determination unit configured to extract behavior information representing behavior of the person from the image information and, based on the behavior information, determine a group composed of a plurality of persons and register group information including the person information;

a first person identification unit configured to identify a first person from the image information taken with the security camera, based on the extracted person information and the extracted behavior information;

a second person identification unit configured to identify a second person belonging to a same group as the first person from the image information taken with the security camera, based on the person information of a person identified as the first person and the group information; and a position identification unit configured to identify a position of the first person and a position of the second person, based on position information of the security cameras used for taking the image information based on which the first person and the second person have been identified, respectively.

(Supplementary Note 2)

The person detection system according to Supplementary Note 1, wherein:

the person extraction unit is configured to extract feature information representing an external feature of a person as the person information; and the first person identification unit is configured to identify a lost child as the first person based on the feature information.

(Supplementary Note 3)

The person detection system according to Supplementary Note 2, wherein the first person identification unit is configured to identify a child acting alone as the lost child who is the first person, based on the behavior information and the feature information.

(Supplementary Note 4)

The person detection system according to Supplementary Note 2 or 3, wherein the second person identification unit is configured to identify the second person as a parent of the lost child identified as the first person, based on the feature information.

(Supplementary Note 5)

The person detection system according to Supplementary Note 1, wherein the person extraction unit is configured to, from image information of a person taken with a camera different from the security camera, extract person information of the person, the person detection system further comprising:

a third person identification unit configured to identify a third person from the group information, based on the person information of the person extracted from the image information taken with the camera different from the security camera; and a fourth person identification unit configured to identify a fourth person belonging to a same group as the identified third person, based on the person information of a person identified as the third person and the group information, and also identify the fourth person from the image information taken with the security camera, based on the extracted person information, wherein the position identification unit is configured to identify a position of the fourth person, based on position information of the security camera used for taking the image information based on which the fourth person has been specified.

(Supplementary Note 6)

The person detection system according to Supplementary Note 5, wherein:

the third person identification unit is configured to identify the third person as a parent; and the fourth person identification unit is configured to identify the fourth person as a child of the parent identified as the third person.

(Supplementary Note 7)

The person detection system according to any of Supplementary Notes 1 to 6, wherein the group determination unit is configured to update and register the group information based on the behavior information extracted from the new image information.

(Supplementary Note 8)

A person detection method comprising:

extracting person information representing a person from image information taken with a security camera;

extracting behavior information representing behavior of the person from the image information and, based on the behavior information, determining a group composed of a plurality of persons and registering group information including the person information;

identifying a first person from the image information taken with the security camera, based on the extracted person information and the extracted behavior information;

identifying a second person belonging to a same group as the first person from the image information taken with the security camera, based on the person information of a person identified as the first person and the group information; and identifying a position of the first person and a position of the second person, based on position information of the security cameras used for taking the image information based on which the first person and the second person have been identified, respectively.

(Supplementary Note 9)

The person detection method according to Supplementary Note 8, wherein:

in extracting the person information, feature information representing an external feature of a person is extracted as the person information; and in identifying the first person, a lost child is identified as the first person based on the feature information.

(Supplementary Note 10)

The person detection method according to Supplementary Note 9, wherein in identifying the first person, a child acting alone is identified as the lost child who is the first person, based on the behavior information and the feature information.

(Supplementary Note 11)

The person detection method according to Supplementary Note 9 or 10, wherein in identifying the second person, the second person is identified as a parent of the lost child identified as the first person, based on the feature information.

(Supplementary Note 12)

The person detection method according to Supplementary Note 8, comprising:

identifying a third person from the group information, based on the person information of a person extracted from image information taken with a camera different from the security camera;

identifying a fourth person belonging to a same group as the identified third person, based on the person information of a person identified as the third person and the group information, and also identifying the fourth person from the image information taken with the security camera, based on the extracted person information; and identifying a position of the fourth person, based on position information of the security camera used for taking the image information based on which the fourth person has been specified.

(Supplementary Note 13)

The person detection method according to Supplementary Note 12, wherein:

in identifying the third person, the third person is identified as a parent; and in identifying the fourth person, the fourth person is identified as a child of the parent identified as the third person.

(Supplementary Note 14)

The person detection method according to any of Supplementary Notes 8 to 13, wherein in registering the group information, the group information is updated and registered based on the behavior information extracted from the new image information.

(Supplementary Note 15)

A computer program comprising instructions for causing an information processing device to realize:

a person extraction unit that extracts person information representing a person from image information taken with a security camera;

a group determination unit that extracts behavior information representing behavior of the person from the image information and, based on the behavior information, determines a group composed of a plurality of persons and registers group information including the person information;

a first person identification unit that identifies a first person from the image information taken with the security camera, based on the extracted person information and the extracted behavior information;

a second person identification unit that identifies a second person belonging to a same group as the first person from the image information taken with the security camera, based on the person information of a person identified as the first person and the group information; and a position identification unit that identifies a position of the first person and a position of the second person, based on position information of the security cameras used for taking the image information based on which the first person and the second person have been identified, respectively.

(Supplementary Note 16)

The computer program according to Supplementary Note 15, wherein, from image information of a person taken with a camera different from the security camera, the person extraction unit extracts person information of the person, the computer program further comprising instructions for causing the information processing device to realize:

a third person identification unit that identifies a third person from the group information, based on the person information of the person extracted from the image information taken with the camera different from the security camera; and a fourth person identification unit that identifies a fourth person belonging to a same group as the identified third person, based on the person information of a person identified as the third person and the group information, and also identifies the fourth person from the image information taken with the security camera, based on the extracted person information, wherein the position identification unit identifies a position of the fourth person, based on position information of the security camera used for taking the image information based on which the fourth person has been specified.

The abovementioned program is stored in a storage unit or recorded on a computer-readable recording medium. For example, the recording medium is a portable medium such as a flexible disk, an optical disk, a magneto-optical disk, and a semiconductor memory.

Although the present invention has been described above with reference to the example embodiments, the present invention is not limited to the example embodiments. The configurations and details of the present invention can be changed in various manners that can be understood by one skilled in the art within the scope of the present invention.

The present invention is based upon and claims the benefit of priority from Japanese patent application No. 2017-023894, filed on Feb. 13, 2017, the disclosure of which is incorporated herein in its entirety by reference.

DESCRIPTION OF NUMERALS 10 information processing system
11 feature extraction part
12 person extraction part
13 individual feature analysis part
14 behavior analysis part
15 group determination part
16 lost child identification part
17 parent identification part
18 person position identification part
21 position information database
22 group database
31 security camera
32 camera
100 person detection system
101 person extraction unit
102 group determination unit
103 first person identification unit
104 second person identification unit
105 position identification unit
110 security camera

What is claimed is:

1. A person detection system comprising:
at least one memory configured to store instructions; and
at least one processor configured to execute instructions to:
extract person information representing a person from image information taken with a security camera;
extract behavior information representing behavior of the person from the image information and, based on the behavior information, determine a group composed of a plurality of persons and register group information including the person information;
identify a first person from the image information taken with the security camera, based on the extracted person information and the extracted behavior information;
identify a second person belonging to a same group as the identified first person from the image information taken with the security camera, based on the extracted person information of the person identified as the first person and the group information;
identify a position of the first person and a position of the second person, based on position information of the security camera used for taking the image information based on from which the first person and the second person have been identified;
identify a third person as a parent from the group information, based on different person information of a different person extracted from different image information taken with a different camera;
identify a fourth person belonging to a same group as the identified third person and who is a child of the parent identified as the third person, from the image information taken within the camera, based on the different person information of the different person identified as the third person and the group information, and based on the extracted person information; and
identify a position of the fourth person, based on the position information of the security camera used for taking the image information from which the fourth person has been identified.

2. The person detection system according to claim 1, wherein the instructions are executed to:
extract feature information representing an external feature of the person as the person information; and
identify a lost child as the first person based on the feature information.

3. The person detection system according to claim 2, wherein the child is a first child,
and wherein the instructions are executed to identify a second child acting alone as the lost child who is the first person, based on the behavior information and the feature information.

4. The person detection system according to claim 2, wherein the parent is a first parent,
and wherein the instructions are executed to identify the second person as a second parent of the lost child identified as the first person, based on the feature information.

5. The person detection system according to claim 1, wherein the instructions are executed to update and register the group information based on the behavior information extracted from the image information.

6. A person detection method comprising:
extracting person information representing a person from image information taken with a security camera;
extracting behavior information representing behavior of the person from the image information and, based on the behavior information, determine a group composed of a plurality of persons and register group information including the person information;
identifying a first person from the image information taken with the security camera, based on the extracted person information and the extracted behavior information;
identifying a second person belonging to a same group as the identified first person from the image information taken with the security camera, based on the extracted person information of the person identified as the first person and the group information;
identifying a position of the first person and a position of the second person, based on position information of the security camera used for taking the image information from which the first person and the second person have been identified;
identifying a third person as a parent from the group information, based on different person information of a different person extracted from different image information taken with a different camera;
identifying a fourth person belonging to a same group as the identified third person and who is a child of the parent identified as the third person, from the image information taken within the camera, based on the different person information of the different person identified as the third person and the group information, and based on the extracted person information; and identifying a position of the fourth person, based on the position information of the security camera used for taking the image information from which the fourth person has been identified.

7. The person detection method according to claim 6, wherein:

in extracting the person information, feature information representing an external feature of the person is extracted as the person information; and in identifying the first person, a lost child is identified as the first person based on the feature information.

8. The person detection method according to claim 7, wherein the child is a first child, and wherein in identifying the first person, a second child acting alone is identified as the lost child who is the first person, based on the behavior information and the feature information.

9. The person detection method according to claim 7, wherein the parent is a first parent, and wherein in identifying the second person, the second person is identified as a second parent of the lost child identified as the first person, based on the feature information.

10. The person detection method according to claim 6, wherein in registering the group information, the group information is updated and registered based on the behavior information extracted from the image information.

11. A non-transitory computer-readable storage medium for storing a computer program comprising instructions for causing an information processing device to:

extract person information representing a person from image information taken with a security camera;

extract behavior information representing behavior of the person from the image information and, based on the behavior information, determine a group composed of a plurality of persons and register group information including the person information;

identify a first person from the image information taken with the security camera, based on the extracted person information and the extracted behavior information;

identify a second person belonging to a same group as the identified first person from the image information taken with the security camera, based on the extracted person information of the person identified as the first person and the group information;

identify a position of the first person and a position of the second person, based on position information of the security camera used for taking the image information from which the first person and the second person have been identified;

identify a third person as a parent from the group information, based on different person information of a different person extracted from different image information taken with a different camera;

identify a fourth person belonging to a same group as the identified third person and who is a child of the parent identified as the third person, from the image information taken within the camera, based on the different person information of the different person identified as the third person and the group information, and based on the extracted person information; and identify a position of the fourth person, based on the position information of the security camera used for taking the image information from which the fourth person has been identified.

* * * * *